United States Patent [19]

Richter

[11] Patent Number: 4,641,180

[45] Date of Patent: Feb. 3, 1987

[54] ELECTRONIC CIRCUIT APPARATUS FOR SEPARATING THE LUMINANCE AND COLOR INFORMATION OF A COLOR TELEVISION SIGNAL

[75] Inventor: Hans-Peter Richter, Griesheim, Fed. Rep. of Germany

[73] Assignee: Robert Bosch GmbH, Stuttgart, Fed. Rep. of Germany

[21] Appl. No.: 598,088

[22] Filed: Apr. 9, 1984

[30] Foreign Application Priority Data

Apr. 4, 1983 [DE] Fed. Rep. of Germany ....... 3313050

[51] Int. Cl.[4] .............................................. H04N 9/78
[52] U.S. Cl. ...................................... 358/31; 358/105
[58] Field of Search ........................... 358/31, 36, 105

[56] References Cited

U.S. PATENT DOCUMENTS

| 4,050,084 | 9/1977 | Rossi | 358/31 |
| 4,498,100 | 2/1985 | Bunting et al. | 358/31 |

FOREIGN PATENT DOCUMENTS

| 123280 | 9/1980 | Japan | 358/31 |
| 2035745 | 6/1980 | United Kingdom | 358/31 |
| 2078054 | 12/1981 | United Kingdom | 358/31 |
| 2114848 | 8/1983 | United Kingdom | 358/31 |

OTHER PUBLICATIONS

G. Illetschko and H. Schönfelder, "Ein Kammfilter für das PAL-Verfahrene", Internatinale Elektronische Rundschau 1969, Nr. 8, pp. 197-200 and English translation.

Primary Examiner—John W. Shepperd
Attorney, Agent, or Firm—Frishauf, Holtz, Goodman & Woodward

[57] ABSTRACT

A single television signal delay chain is interconnected with linear combination matrices for frame comb filtering and line comb filtering. Related circuits provide correction signals for controllably eliminating the frame or the line comb filtering. Detectors are provided for movement and for edges in the picture content and these detectors supply signals to a picture blending circuit for selecting the most appropriate kind of comb filtering for the current picture content. The circuits operate on a digital basis with a sampling frequency which is an integral multiple of the line scanning frequency.

7 Claims, 16 Drawing Figures

MOV'T DET'CT'R: $z = e^{jw\tau_{2V}}$ $H_1(z) = \frac{1}{2} F_1 (z^1 - z^{-1}) \triangleq \frac{1}{2} F_1 ( ① - ③ )$ $H_2(z) = \frac{1}{2} F_1 (-\frac{1}{2} z^{+1} + z^0 - \frac{1}{2} z^{-1}) \triangleq \frac{1}{2} F_1 (-\frac{1}{2} ① + ② - \frac{1}{2} ③ )$ EDGE DET'R: $z = e^{jw\tau_H}$ $H_1'(z) = \frac{1}{2}(z^2 - z^{-2}) \triangleq \frac{1}{2}(①' - ③')$ COMB FIL. PROC'R:
a) FRAME COMB FIL.: $z = e^{jw\tau_{2V}}$ $Y = \frac{1}{2}(z^1 + z^{-1}) \triangleq \frac{1}{2}(① + ③)$ $C_1 = \frac{1}{2}(z^1 - z^0) \triangleq \frac{1}{2}(① - ②)$ $C_2 = \frac{1}{2}(z^0 - z^{-1}) \triangleq \frac{1}{2}(② - ③)$ $Y_k = F_1(-\frac{1}{2} z^{+1} + z^0 - \frac{1}{2} z^{-1}) \triangleq F_1(-\frac{1}{2} ① + ② - \frac{1}{2} ③)$ b) LINE COMB FIL.: $z = e^{jw\tau_H}$ $Y' = \frac{1}{2}(z^1 + z^{-1}) \triangleq \frac{1}{2}(①' + ③')$ $C_1' = \frac{1}{2}(z^1 - z^0) \triangleq \frac{1}{2}(①' - ②')$

$C_2' = \frac{1}{2}(z^0 - z^{-1}) \triangleq \frac{1}{2}(②' - ③')$

$Y_k' = F_1(-\frac{1}{2} z^{+1} + z^0 - \frac{1}{2} z^{-1}) \triangleq F_1(-\frac{1}{2} ①' + ②' - \frac{1}{2} ③')$

$C_{1k}' = F_2(-\frac{1}{2} z^1 + z^0) \triangleq F_2(-\frac{1}{2} ①' + ②')$ $C_{2k}' = \frac{1}{2} F_2 z^{-1} \triangleq \frac{1}{2} F_2 ③'$

$$H(z) = -\tfrac{1}{4}z^1 + \tfrac{1}{2}z^0 - \tfrac{1}{4}z^{-1}$$

MOV'T DETECTOR : $z = e^{jw\tau_{2v}}$  $\tau_{2v} = 33{,}36667$ ms $H_1(z) = \frac{1}{2}(z^1 - z^{-1}) \triangleq \frac{1}{2}(①  - ③)$ $H_2(z) = -\frac{1}{4}z^1 + \frac{1}{2} - \frac{1}{4}z^{-1} \triangleq -\frac{1}{4}① + \frac{1}{2}② - \frac{1}{4}③$ $|H_{B0}(jw)| = \frac{1}{2}(|H_1(jw)| + F_1|H_2(jw)|) = \frac{1}{2}(|\sin w\tau_{2v}| + F_1 \sin^2 \frac{w\tau_{2v}}{2})$ EDGE DETECTOR: $z = e^{jw\tau_H}$   $\tau_H = 63{.}555567 \mu s$

SAME AS MOV'T DET. WITH  ①'  INSTEAD OF  ①

AND WITH  ③'  INSTEAD OF  ③

COMB FILTER PROC'R :

a) FRAME COMB FILTER: $z = e^{jw\tau_{2v}}$ $Y = \frac{1}{4}z^{+1} + \frac{1}{2} + \frac{1}{4}z^{-1} \triangleq \frac{1}{4}① + \frac{1}{2}② + \frac{1}{4}③$ $C = -\frac{1}{4}z^1 + \frac{1}{2} - \frac{1}{4}z^{-1} \triangleq -\frac{1}{4}① + \frac{1}{2}② - \frac{1}{4}③$ $Y_K = F_1 C$ b) LINE COMB FITER : $z = e^{jw\tau_H}$ $Y' = \frac{1}{4}z^1 + \frac{1}{2} + \frac{1}{4}z^{-1} \triangleq \frac{1}{4}①' + \frac{1}{2}② + \frac{1}{4}③'$ $C' = -\frac{1}{4}z^1 + \frac{1}{2} - \frac{1}{4}z^{-1} \triangleq -\frac{1}{4}①' + \frac{1}{2}② - \frac{1}{4}③'$ $Y'_K = F_1 C'$ $C'_K = F_2 Y'$

LOW PASS $F_1$ AND BAND P. $F_2$ :

Fig.10

ELECTRONIC CIRCUIT APPARATUS FOR SEPARATING THE LUMINANCE AND COLOR INFORMATION OF A COLOR TELEVISION SIGNAL

In addition to simple frequency dividing networks composed of a high-pass and a low-pass filters for separating the luminance information from the color information of a color television signal utilizing a quadrature modulated auxiliary carrier in the high frequency part of the composite signal for the color information, another method of separating luminance from color information that is known is the so-called comb filter. When the luminance and color components are separated by means of comb filters, the high frequency component of the luminance signal remains contained in the separated luminance signal, so that the resolution of the reproduced picture corresponds to the full band width available for transmission of the color television signal, but other errors arise in this case, however. For example, it is assumed in the case of a line comb filter that the picture content of two successive lines is substantially the same. When that is not the case, thus, when horizontal edges are present in the picture, disturbances arise. Even limiting the line comb filtering to the higher frequency region does not lead to an error-free separation. In this case, errors appear at oblique edges.

These errors can be reduced or avoided with full picture comb filters ("frame" comb filters), which operate error-free only for the quiescent portions of the picture. In a manner similar to the behavior of line comb filters when edges appear in the picture, there occur errors in the present case when there is movement in the picture content.

It was accordingly proposed some time ago by C. K. P. Clark at the International Broadcasting Covention, IEE 220, Sept. 20-21, 1982, Brighton, England (363-366 of the Convention Volume) that the two kinds of comb filters should be connected to each other and the comb filter suited for the particular picture content should be switched in by a movement detector. Apparatus suitable for that purpose, however, has not been known heretofore.

SUMMARY OF THE INVENTION

Briefly, frame and line comb filters are combined by providing for delay of the television signal for two frames in a delay unit that not only has a mid-tap where a signal delayed by the one frame is available, but also has additional taps providing the signal respectively delayed by one frame less one line and by one frame plus one line, with the linear matrix circuit for the frame filter connected to the input, mid-tap and output of the delay unit, and the linear matrix circuits of the line comb filter connected to the three taps. A picture movement detector circuit is provided and also a picture blending circuit, the latter being connected to the outputs of the linear matrices and also having a control input connected to the picture movement detector for automatically determining which of the matrices is to be effective and for blending from the output of one matrix over to the output of the other without noticeable discontinuity. In the case of a color television signal of the PAL standard, each matrix has a luminance output and two chrominance outputs, whereas in the case of a color television signal according to the NTSC standard, each matrix has a luminance output and one chrominance output.

It is advantageous to provide both a movement detector and a detector of edges in the pictures for controlling the picture blending circuit and these detection circuits can be conveniently interconnected with the linear matrix circuits above-mentioned, which may be collectively referred to as the comb filter processor circuits.

Further details of the organization and operation of the apparatus of the invention will be evident from the description that follows.

BRIEF DESCRIPTION OF THE DRAWINGS

The invention is further described below by way of illustrative examples with reference to the annexed drawings, in which:

FIG. 11 is a block circuit diagram similar to that of FIG. 2, but relating to FIG. 9 instead of FIG. 1 and concerning the processing, in accordance with FIG. 10, of an NTSC standard color television signal, and FIG. 12 is a block diagram similar to that of FIG. 6, but relating to FIG. 9 instead of FIG. 1 and concerning the processing, in accordance with FIG. 10, of an NTSC standard color television signal.

A part shown in one figure of the drawings which is the same as one shown in another figure of the drawing is designated with the same reference numerals.

DESCRIPTION OF THE ILLUSTRATED EMBODIMENTS

Figure 1:
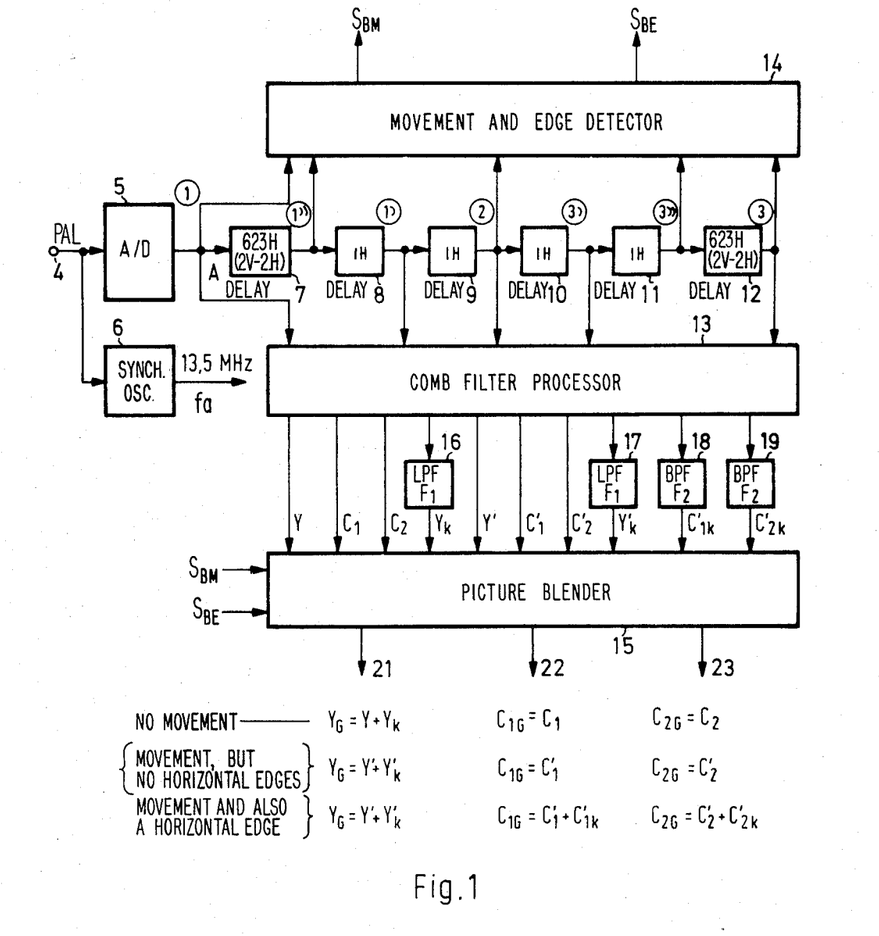
FIG. 1 is an overall block circuit diagram of an illustrative embodiment of the invention, together with a table describing the basic logic of the picture blending circuit 15.

FIG. 1 shows a block circuit diagram for a luminance/color hue signal splitter for PAL color television signals. The analog composite video signal, supplied at the terminal 4 from a source not shown in the drawings, is converted into digital form in the analog to digital converter 5 and is supplied to the synchronized frequency generator 6 for producing a sampling frequency $f_s$ which is phase-locked to the synchronizing pulses of the composite video signal. In the circuit 6, an oscillator produces the frequency $f_a$ at its output, which is an integral multiple of the line scanning frequency of the composite television signal and the oscillator frequency is divided and compared in phase with the horizontal synchronizing pulses separated from the composite video signal, with the oscillator frequency then being regulated by the phase comparison results to keep it in step.

The output of the A/D converter 5 goes to a delay chain 7-12 having an input for the undelayed signal, an output for the signal with maximum delay and five intermediate television signal connections, making a total of seven signal connections. The total propagation time of the television signal through the delay chain is two frames (80 ms). The subdivision of the delay is so chosen that fading between frame comb filtering and line comb filtering is possible in a manner that conforms to the propagation time of the signal.

The delay units 7 and 12 have a delay time equal to a frame period less two line periods, $(\tau_{2V} - 2\tau_H)$, or 623 lines for the PAL system while the delay circuits 8, 9, 10 and 11 each delay the signal by one line period $\tau_H$, sometimes designated 1H.

Figure 2:
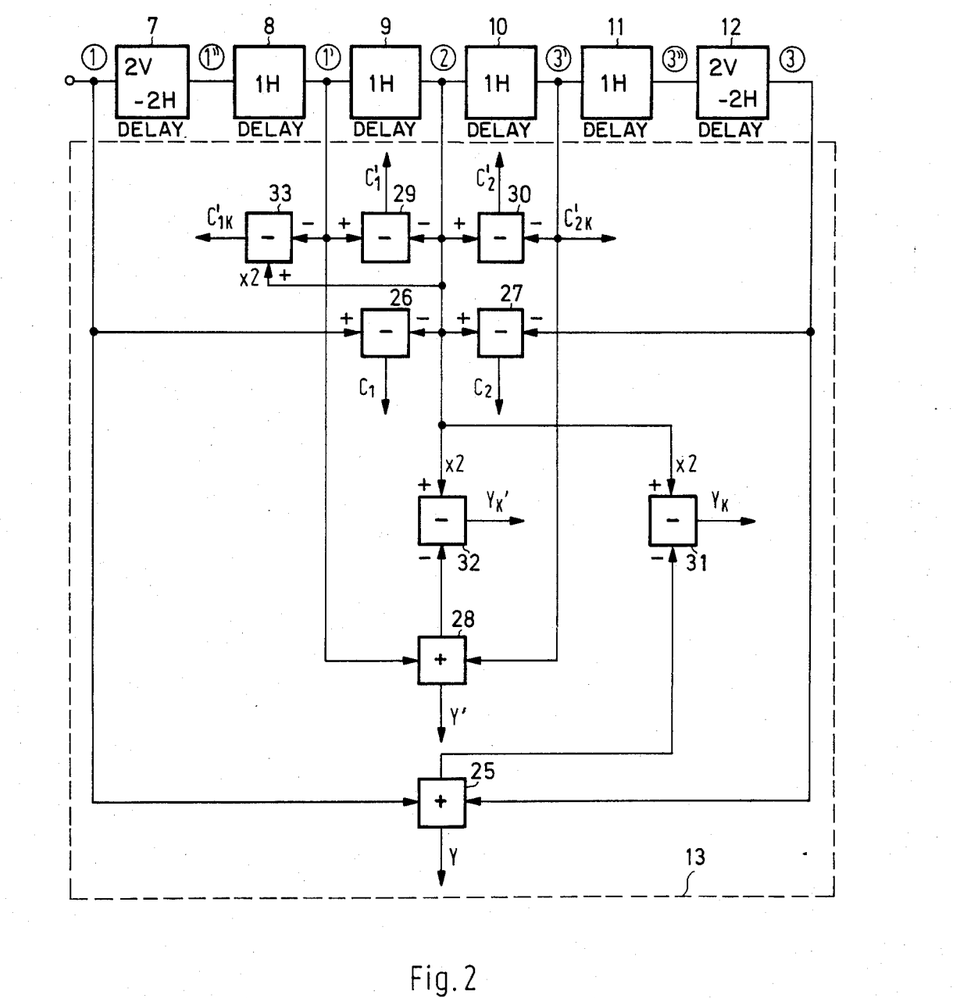
FIG. 2 is a block circuit diagram of the comb filter processor portion of the circuit of FIG. 1 for the case of handling a PAL standard color television signal.

The comb filter processor 13 of FIG. 1, which is shown in more detail in FIG. 2, receives the signals from five connections of the delay chain, designated in FIGS. 1 and 2 by the circled reference numerals 1, 1', 2, 2', and 3 and produces from these comb filtered luminance and color hue signals. and also various correction signals according to how the comb filter processor is constituted.

Figure 4:
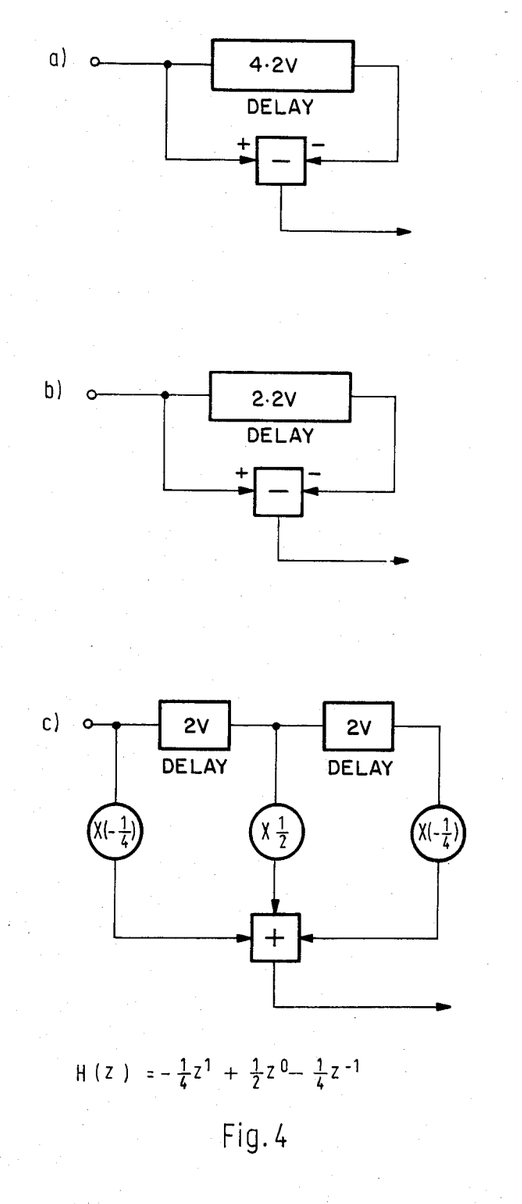
FIGS. 4a, 4b and 4c are block circuit diagrams respectively representing different kinds of motion detectors.
Figure 5:
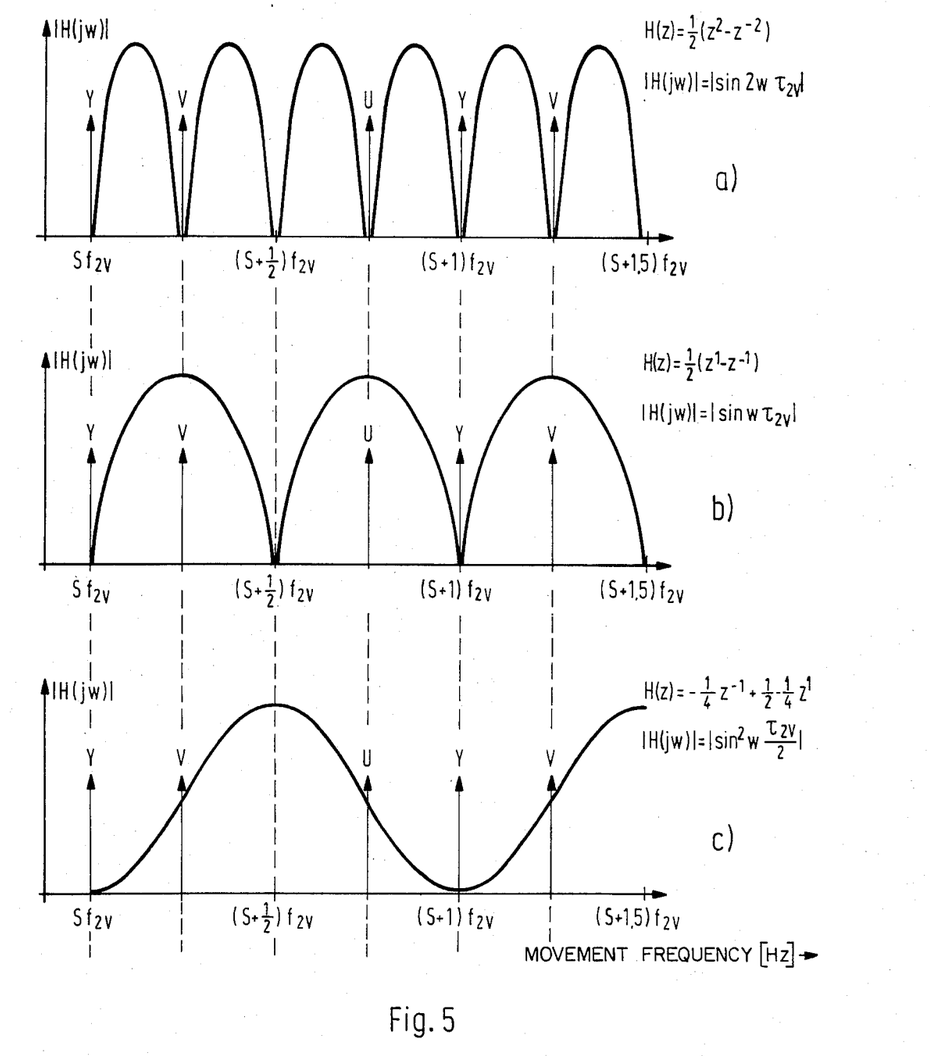
FIGS. 5a, 5b and 5c are wave diagrams drawn to a common time scale for explaining the operation of the respective circuits of FIGS. 4a, 4b and 4c.

A movement and edge detector 14 is connected to all seven connections of the delay chain and operates to provide, to the blender circuit 15, a control signal $S_{BM}$ when a movement is detected and a control signal $S_{BE}$ when an edge is detected in the picture content. Examples of movement and edge detectors are explained further below with reference to FIGS. 4a, 4b and 4c.

The picture blender 15 is described in more detail below with reference to FIG. 7. As shown in FIG. 1, it has three outputs, 21, 22 and 23 which respectively provide the luminance signal and two color hue signals. The picture blender is controlled in such a way that during quiescent picture content the luminance and color hue signals obtained by frame comb filtering are provided to the outputs 21, 22 and 23. If movement occurs and no horizontal edges are present in the picture, the output signals are then obtained from the results of line comb filtering. When horizontal edges appear, it is further possible, finally, in order to reduce disturbing edge effects, to switch over to filtering by a high pass low pass frequency range dividing network. It has been found in practice, however, that even without this last-mentioned provision, switching between the frame comb filter and the line comb filter, with blending, already provides excellent results. It should be further mentioned, finally, that the synchronized frequency generator 6 which provides a sampling frequency that is an integral multiple of the line scanning frequency, preferably provides a sampling frequency of 13.5 MHz, since this value, on the one hand, satisfies the requirement of the system of the invention and, on the other hand, it is widely used as a standard sampling frequency for other digital video signal transmission and processing devices and systems. Furthermore, with a sampling frequency $f_a$ which is an integral multiple of the line scanning frequency, it is easy to operate with digital components such as shift registers, FIFO storage devices and RAMS, to provide delay time that corresponds exactly either to one television line, or two or more lines.

The comb filter processor 13 of FIG. 1 will now be further explained with reference to FIGS. 2 and 3. For reasons of clarity and presentation, the delay chain 7-12 is shown once more in FIG. 2, along with the comb filter processor 13. The digital color television signal, supplied at the terminal 1 to the delay chain, appears at the tap 2 delayed by the period of one frame and at tap 3, delayed by the period of two frames. The tap 2 designates the median delay. Compared to the signal at the mid-tap 2, the signals at the taps 1' and 3' appear respectively with a lead and with a delay of one line.

Figure 3:
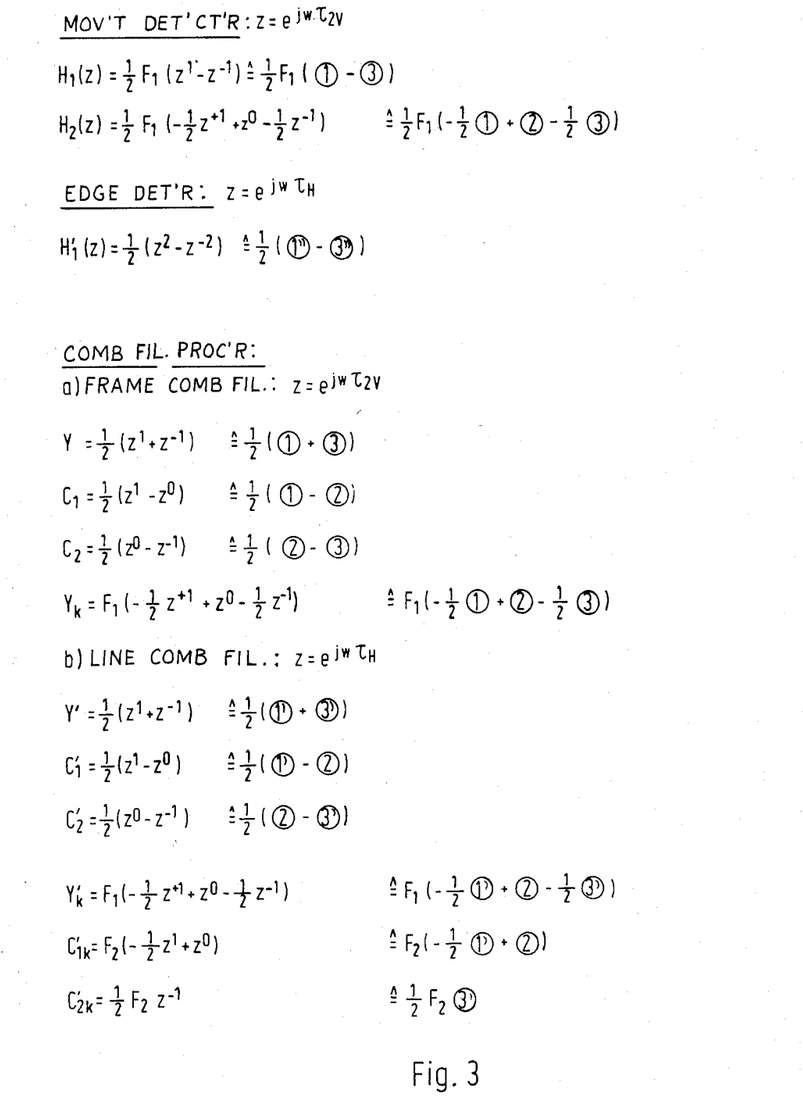
FIG. 3 is a table of equations defining the linear combinations and the resulting signals produced in the apparatus of FIGS. 1 and 2, as well as the operation of the movement detector and the picture edge detector.

The description of the outputs of the comb filter processor 13 is best understood with reference to the Z-transformation as set forth in the equations of FIG. 3. In FIG. 3, $z^0$ corresponds to the time position of the signals at the mid-tap 2, $z^1$ represents a signal one unit (line or frame) in advance and $z^{-1}$ represents a signal one unit behind (delay). In the equations in FIG. 3, the signals are also represented with relation to the circled reference numerals of the taps of the delay chain.

The comb filter process of 13 contains essentially two matrix circuits which, together with the related taps of the delay chain form, on the one hand, a line comb filter and, on the other hand, a frame comb filter.

The matrix circuit which forms the frame comb filter is constituted by the addition circuit 25 and the subtraction circuit 26 and 27. The signal one frame in advance of the mid-tap signal and the signal one frame behind the mid-tap signal are added together in the addition circuit 25 which has the result of extinguishing the chrominance information because of the 180° phase offset between the respective color carriers of the two signals added. The subtraction and addition circuits 25, 26 and 27 also involve amplitude attenuation by a factor $\frac{1}{2}$, as is evident the equations set forth in FIG. 3. The subtraction circuits 26 and 27 generate the chrominance signals $C_1$ and $C_2$ by forming the differences between the mid-tap signal and, respectively, the signal one frame behind the mid-tap signal and the signal one frame in advance thereof. These color hue signals consist. alternately line by line, of the difference and the sum of the color difference signals U, V and can be demodulated in the manner described with reference to FIG. 8. Matrix circuits of the kind similar to the kind used for frame comb filtering are used for line comb filtering by the addition circuit 28 and the two subtraction circuits 29 and 30. The later two are supplied respectively with signals one line in advance and one line behind the mid-tap signal and of course are supplied with the mid-tap signal. They generate the signals Y', $C'_1$ and $C'_2$ represented in the equations of FIG. 3.

The correction signals $Y_k$ and $Y'_k$ produced by the subtractions circuits 31 and 32 are such that they eliminate the comb filter effect when added respectively to Y and Y'. Since they are passed through a low pass filter before proceeding to the blending circuit 15 for the addition just mentioned, the comb filtering is nevertheless preserved for the higher frequency region. The correction signal $C'_{1k}$ is derived by means of the subtraction circuit 33, whereas the correction signal $C'_{2k}$ corresponds to the television signal at the tap 3'. These correction signals lead to an exact elimination of the line comb filtering in the chrominance channel in the case of moving vertical color edges, but only in the frequency region of the color carrier, when they are respectively added to $C_1$ and $C_2$ in the blending circuit 15. For higher frequency chrominance components the band pass characteristic goes over into a comb filter characteristic, as the result of the corrections signals $C'_{1k}$ and $C'_{2k}$ being supplied blender 15 through the respective band pass filters 18 and 19.

In connection with FIGS. 4a, 4b, and 4c and 5a, 5b and 5c, a few methods for detecting movement in the picture content are explained. The possibility shown in FIGS. 4a–4c by way of circuit block diagrams are as follows:

(a) comparison of color television signals separated in time by four frames.

(b) comparison of color television signals separated in time by two frames, and (c) delaying the color filler television signals twice by one frame and combination of the undelayed, once delayed and twice delayed signals according to the equation set forth in FIG. 4c.

The circuits shown in FIGS. 4a–4c result in the frequency spectra respectively shown in FIGS. 5a–c on a common frequency scale. The transmission function of the filter constituted by the circuits shown in FIGS. 4a–c is shown as a function of the frequency of motion. The frequency characteristic shown FIG. 5a for the movement detector of FIG. 4a is based on the fact that the displaced picture features produce spectral line which lie between the lines of the fine spectrum. Spectral lines of moving features which collide with the fine spectrum of quiescent features, and are therefore not unambiguously separable, are not sensed by the motion detector. Apart from the large number of null positions and the insensitivity resulting therefrom with respect to particular frequencies of motion, the frequency characteristic of FIG. 5a requires a total delay of four frame periods and for that reason cannot be realized with the delay chain of FIG. 1. Proceeding, however, on the basis that movement of the color picture is in most cases connected with movement in the luminance picture and that a certain amount of movement entrainment in the color signal is tolerable because of the narrow band width, then it is sufficient to limit the operation of the movement detectors to the luminance signal. Avoidance of the disturbing chrominance information in the luminance movement signal can be accomplished by horizontal or vertical low pass filtering. Horizontal band limiting interferes with movement recognition for high frequency (horizontal) luminance features. Vertical low pass filtering produces a movement signal with respect to quiescent vertical color transitions and therefore makes sense only in connection with an edge detector.

With a total delay of two frames, the frequency characteristics represented in FIGS. 5b and 5c can be provided for movement recognition in the luminance channel.

The frequency characteristic shown in FIG. 5c has no null position for movement frequencies between 0 and 25 Hz and, moreover, attenuates the disturbing (quiescent) color hue components of 6 dB. A disadvantage is the small sensitivity for slow movements.

The movement detector according to FIG. 4b with the frequency characteristic of FIG. 5b reveals even slight movement, but, however, has a null position for movement frequencies of 12.5 Hz. A combination of the frequency characteristics according to FIGS. 5b and 5c avoids the disadvantages of the individual circuits. Such a combined circuit is practically implemented in connection with the illustrated embodiment of the invention and is shown in FIG. 6.

Figure 6:
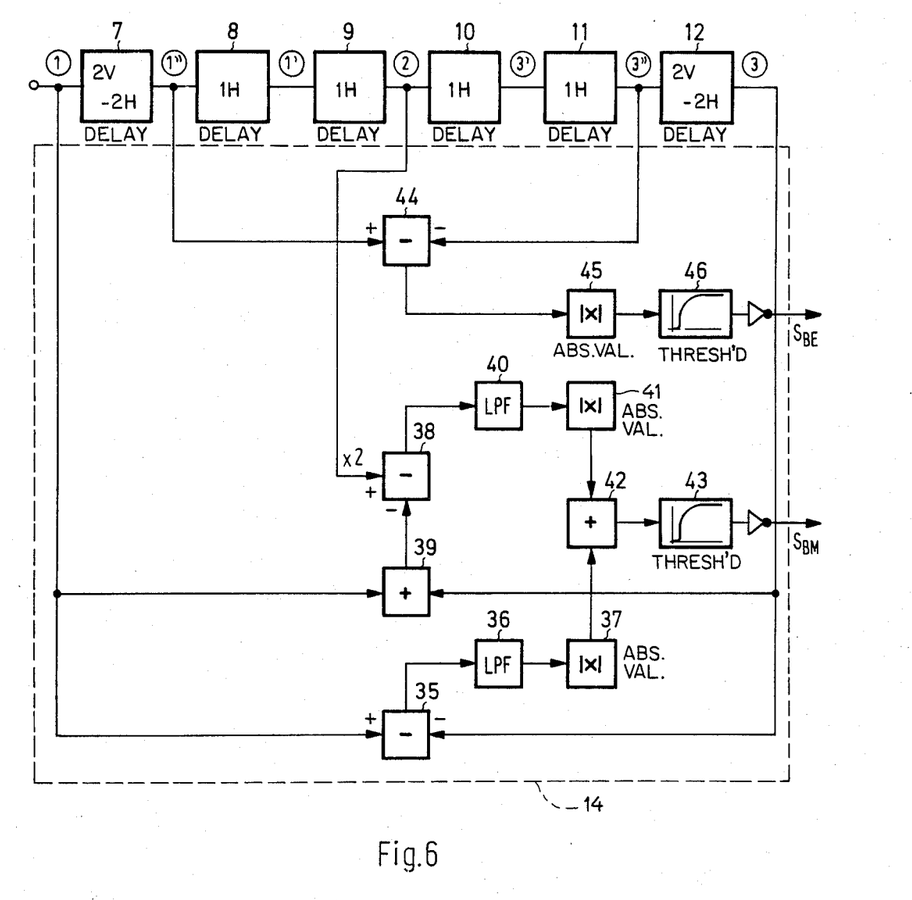
FIG. 6 is a block circuit diagram of a movement and edge detector such as the one shown more generally in FIG. 1.

FIG. 6 illustrates the movement and edge detector 14 generally shown in FIG. 1, with the delay chain again shown. The circuit blocks 35, 36 and 37 serve in this case as filters having a frequency characteristic according to FIG. 5b and the circuit block 38 to 41 as filters having a frequency characteristic according to FIG. 5c. In particular, it should be explained that the signals obtained from the taps 1 and 3 of the delay chain 7–12 are subtracted in the subtraction circuit. The output signal of the subtraction 35 is then supplied to a low-pass filter 36 and then thereafter through a circuit 37 for forming the absolute value of the difference signal over to an addition circuit. The signal from the taps 1 and 3 of the delay chain 7–12 are added in the addition circuit 39 and subtracted in the subtraction circuit 38 from the double value of the signals from tap 2 of the delay chain. The result is put through a low-pass filter 40 and a circuit 41 for forming the absolute value and then delivered to another input of the addition circuit 42. In this manner, a superposition of the characteristic lines shown in FIGS. 5b and 5c is produced so that, on the one hand, even slow movements can be recognized and, on the other hand, no null position is present for a movement frequency as low as 12.5 Hz. The output of the addition circuit 42 is connected to the input of a non-linear circuit 43 that operates as a threshhold circuit and has a transfer characteristic like the one sketched in that circuit block in FIG. 6. The circuit 43 serves to generate the movement signal $S_{BM}$ when, on the one hand, slow movements are present and, on the other hand, few contrast-rich picture details are in motion. The recognition of horizontal edges takes place by subtraction of the signals at the taps 1" and 3" by means of the subtraction circuit 44, the output signal of which proceeds to an absolute value circuit 45 and then to a circuit 46 with a transfer characteristic similar to that of circuit 43 in order to produce an output signal $S_{BE}$.

Figure 7:
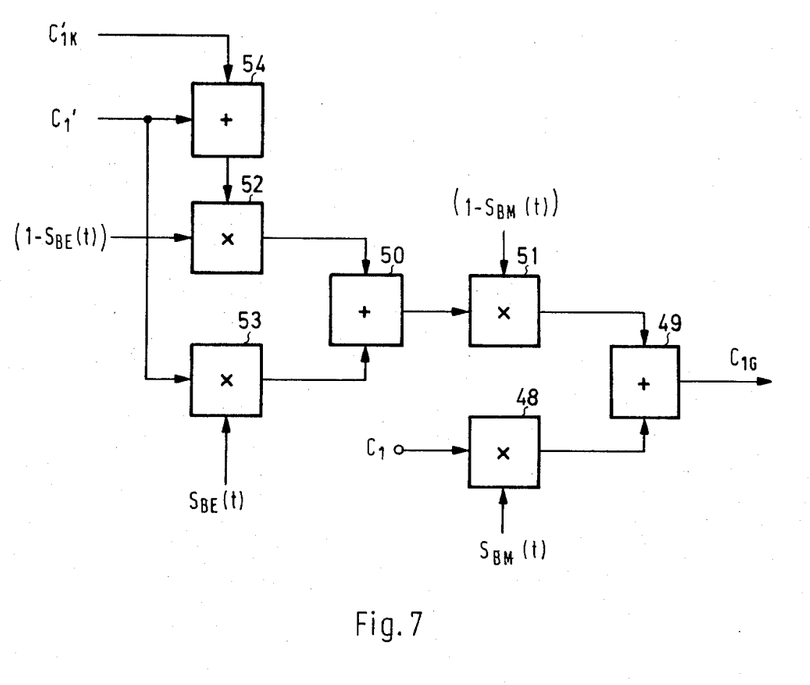
FIG. 7 is a block circuit diagram of a picture blending circuit such as the one shown more generally in FIG. 1.

The block circuit diagram shown in FIG. 7 illustrates a picture blending circuit such as the one provided in the blender 15 of FIG. 1 for the signals $C_{1G}$, $C_{2G}$. There is also provided in the blender 15 a similar circuit for the provision of the luminance signal $Y_G$. The signals $C_1$, $C'$, and $C'_{1K}$ are supplied from the comb filter processor to the circuit of FIG. 7. The circuit receives the signals $S_{BM}$ and $(1-S_{BM})$.

When movement is present in the picture the signal $S_{BM}$ is 0 and when the picture is quiescent, this signal is 1. For a quiescent picture the signal $C_1$ is supplied through the multiplier circuit 48 to the addition circuit 49. Since for this case the value $1-S_{BM}$ equals zero, only value $C_1$ reaches the output through the addition circuit 49 and can be taken off there as the signal $C_{1G}$. If movement is present, however, the signal $C_1$ does not reach the addition circuit 49 but instead the output signal of the addition circuit 50 gets there over the multiplier circuit 51. There are supplied, to the addition circuit 50, the output signals of the multiplier circuits 52 and 53 which are controlled by the signals $S_{BE}$ and $(1-S_{BE})$. The sum of the signals $C'_1$ and $C'_{1K}$ formed by the addition circuit 54 is supplied to the multiplying circuit 42 while the signal $C'_1$ is supplied to the multiplier circuit 53.

If there are no edge features present in the picture, the signal $S_{BE}=1$. The signal $C'_1$ is then supplied over the multiplier circuit 53 to one input of the addition circuit 50 and then proceeds to the output through the multiplier circuit 51 and the addition circuit 49. If edge features are present, however, the multiplier circuit 53 blocks the further advance of the signal $C'_1$ and of the signal $C'_{1K}$ to the output. The corresponding circuits for the signals $C_{2G}$ and $Y_G$ are shown in FIG. 1.

As already explained in connection with FIG. 1, the chrominance signals alternate line by line as sum and difference of the color difference signals. They also still have the color carrier frequency. In order to be able to derive digital color difference signals U, V, a circuit according to FIG. 8 can be used. In that circuit the signals $C_{1G}$ and $C_{2G}$ are respectively supplied to the multiplier 56 and 57 where they are quadrature modulated by the color carrier provided by the oscillator 59. A known type of synchronous demodulation results and produces the signals $C_{1dem}$ and $C_{2dem}$. The oscillator 59 is controlled in a known way by the color synchronizing signal obtained in a known way by a burst evaluation circuit 58.

By addition together the two demodulated chrominance signals in the addition circuit 60, a color difference signal V is produced, the polarity of which, however, changes from line to line. Therefore, it is supplied through a phase reversal circuit 61 to which a switching signal from the burst evaluation circuit 58 is supplied for inversion in every other line. The signal V thus produced is supplied to a low-pass filter 62 which suppresses the residues of the color carrier. In the illustrated embodiment of the invention, the system operates with a sampling frequency $f_s$ of 13.5 MHz. Since the color information requires only a small band width, a much lower sampling frequency is also provided for digital transmission of the color difference signal, namely 6.75 Hz. The circuit according to FIG. 8 accordingly includes, after the low-pass filter 62 still another circuit 63 for conversion of the sampling frequency rate.

Figure 8:
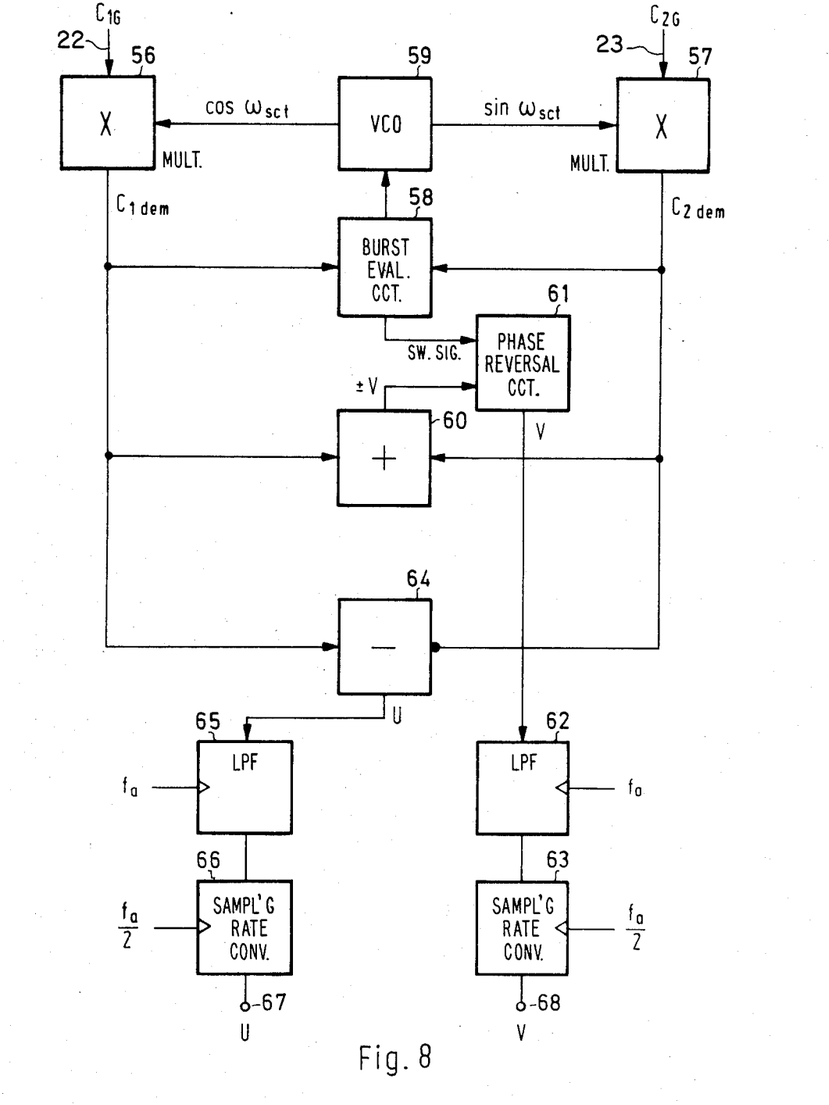
FIG. 8 is a block circuit diagram of a demodulator for a PAL standard color television signal.

The color difference signal U is obtained by means of the subtraction circuit 64 from the demodulated chrominance signals and is likewise supplied through a low-pass filter 65 and a circuit 66 for conversion of the sampling rate. Color difference signals U,V are therefore made available in digital form at the outputs 67 and 68.

Figure 9:
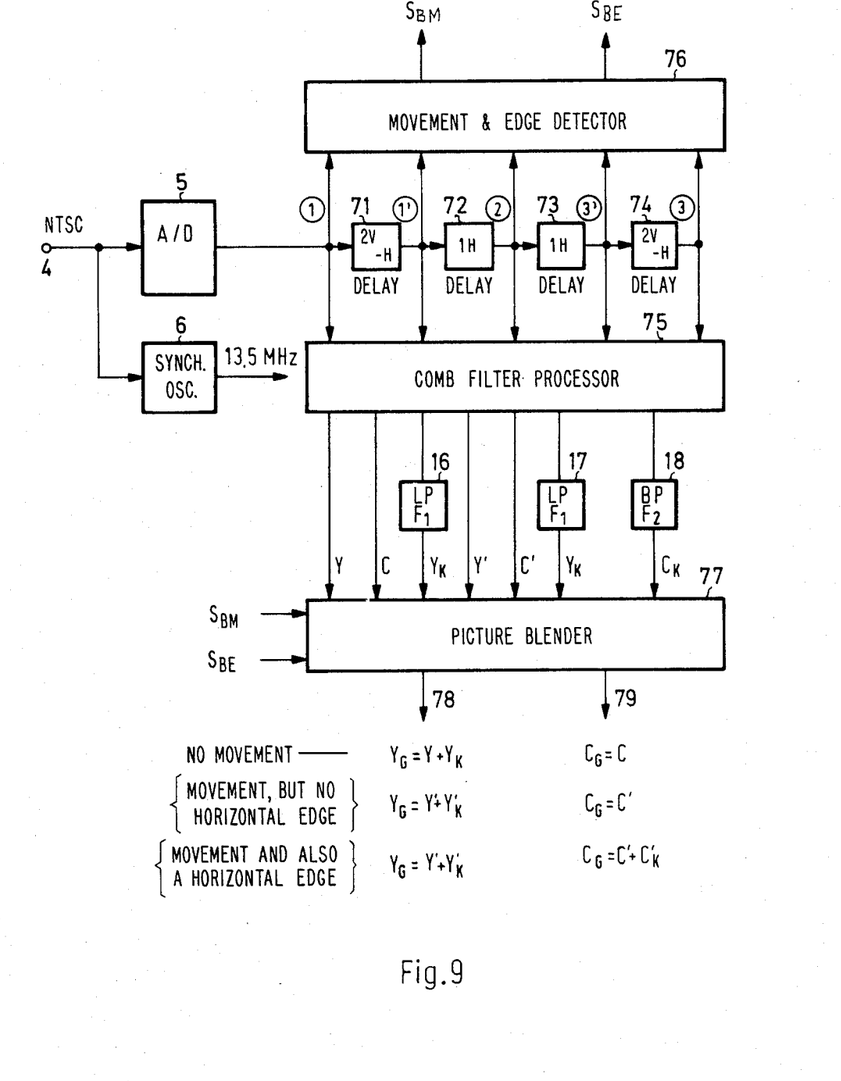
FIG. 9 is a block circuit diagram similar to that of FIG. 1, but relating to the case apparatus for separating the luminance and color hue information of an NTSC standard color television signal.

The illustrated embodiment described with reference to FIGS. 1 to 8 is designed for PAL standard color television signals. Apparatus according to the invention for NTSC signals are now described with reference to FIG. 9. The following differences compared to PAL signals are of importance:

The color carrier has a different frequency offset,

There is no switching over of the polarity of one of the color difference signals.

As a result of the half line offset of the NTSC signal, it is possible to obtain a full NTSC comb filter with a delay of a single frame. In that case, however, there results a frequency characteristic in the nature of a sine function, which therefore has very narrow null locations. This has the result that the filtering effect drops off strongly even with small movements in the picture content. With a comb filter with delays of a total of two frames, however, a frequency characteristic of a squared sine function is obtained, with the result that filtering is still satisfactory with greater movement. Such filtering is used in the circuit of FIG. 9.

Figure 10:
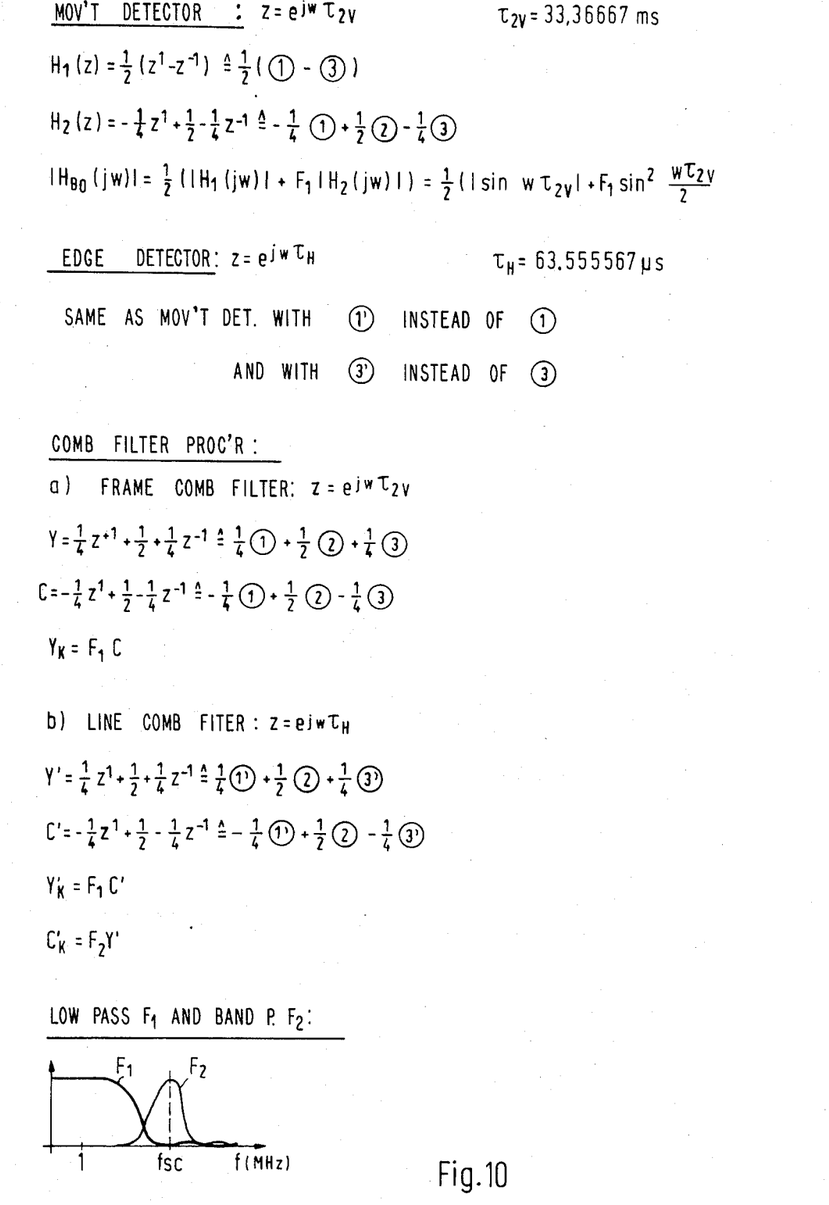
FIG. 10 is a table relating to FIG. 9 and corresponding to the table of FIG. 3 which relates to FIG. 1, FIG. 10 also including at the bottom a frequency diagram explanatory of the filters $F_1$ and $F_2$ referred to in FIG. 3 and in the rest of FIG. 10.

As in the case of FIG. 1, the color television signals are converted from analog to digital form, and, again, a sampling frequency $f_s=13.5$ MHz is obtained by means of a synchronized oscillator 6. The digital color television signals are now sequentially passed through the delay units 71, 72, 73 and 74. The tap 2 provides a delay of one frame compared to the undelayed signal at tap one 1 and the tap 3 a delay of two frames. At the taps 1' and 3' there are signals which respectively lag and precede the signal at the tap 2 by one line. The signals from the various taps are then supplied to a comb filter processor 75 and a movement and edge detector 76. These circuits are constituted similarly to the corresponding circuits of FIG. 1. The comb filter processor is shown in FIG. 11. The equations that apply to the NTSC signals are given in FIG. 10. In the embodiment for NTSC signals, only one chrominance signal C, C' is provided by each matrix of the processor 75. This would also be possible for PAL signals. It would, however, be disadvantageous in the case of PAL signals insofar as there would have to be a first integration effect over two lines through the comb filter processor and a second in the demodulation. This doubled integration effect is prevented in the embodiment of FIG. 1 by the generation of the signals $C_1$ and $C_2$ which, as already mentioned above, contain alternately line by line the sum and the difference of the color difference signals.

For the NTSC signals such a precaution is not necessary, since no averaging is produced by the demodulation.

The movement and edge detector 76 for NTSC signals is connected to the taps 1, 1', 2, 3' and 3 of the delay chain and is constituted as shown in FIG. 12, which will be recognized as similar to the system of FIG. 6. The equations related to the frequency characteristic are given in FIG. 10. The blending unit 77 for NTSC signals contains a circuit according to FIG. 7 for the chrominance hue signals and a similar circuit for the luminance signals. The signals $Y_G$ and $C_G$ are thus made available at the respective outputs 78 and 79. Although the invention has been disclosed with reference to particular illustrative embodiments, it will be understood that variations and modifications are possible within the inventive concept.

I claim:

1. Apparatus for separation of the luminance and the color information of a PAL standard television signal having a quadrature modulated color carrier wave, comprising:

signal delay means (7-12) for delaying said television signal for two television frame periods having input and output connections and having taps for making accessible partially delayed signals, said taps respectively making available said television signals at delays of one frame less one line, one frame and one frame plus one line:

a first linear matrix (25, 26, 27) for separating luminance and color information, having inputs respectively connected to said signal delay means at said input connection, said output connection and said tap for signals delayed one frame, for combining the signals at its said respective inputs to produce a luminance signal (Y) by adding together the signals at said input and output of said signal delay means and to produce a first chrominance signal ($C_1$) by subtracting the signals at said tap for signals delayed one frame from the signals at said input connection of said signal delay means and a second chrominance signal ($C_2$) by subtracting the signals at said output connection of said signal delay means from the signal at said tap for signals delayed one frame;

a second linear matrix (28, 29, 30) having inputs respectively connected to said signal delay means at all three said taps thereof for combining the signals at its said respective inputs to produce a luminance signal (Y') by adding the signals at said tap making available signals delayed by one frame less one line to the signals at said tap making available signals delayed by one frame plus one line and to produce a first chrominance signal ($C_1'$) by subtracting the signals at said tap making available signals delayed by one frame from the signals at said tap making available signals delayed by one frame less one line and a second chrominance signal ($C_2'$) by subtracting the signals at said tap making available signals delayed by one frame plus one line from the signals at said tap making available signals delayed by one frame;

picture blending means connected to said outputs of said linear matrices and also having a control input for producing blended pictures from said outputs of said linear matrices with a blending mix regarding the respective contributions of said first and second matrices determined by said control input, and a picture movement detector circuit having inputs respectively connected to said signal delay means at said input connection thereof, said output connection thereof and said tap for signals delayed one frame and having an output connected to said control input of said picture blending means.

2. Apparatus according to claim 1 in which said picture movement detector circuit comprises:

first addition means (39) having its input connected respectively to said input and said output connections of said signal delay means:

first subtraction means (35) having its input connected respectively to said input and said output connections of said signal delay means:

a first low pass filter (36) having its input connected to the output of said first subtraction means;

a first absolute value circuit means (37) having its input connected to the output of said low pass filter, for producing a signal of constant sign and of a magnitude equal to the magnitude, regardless of sign, of the output signal of said low pass filter;

second subtraction means (38) having its input respectively connected to said tap connection of said signal delay means for signals delayed one frame and to the output of said first addition means (39);

a second low pass filter (40) having its input connected to the output of said second subtraction means;

a second absolute value circuit (41) having its input connected to the output of said second low pass filter (40), for producing a signal of constant sign of a magnitude equal to the magnitude of the output of said second low pass filter regardless of the sign thereof;

second addition means (42) having its input connected to the respective outputs of said first and second absolute value circuits (37, 41), and a threshold value circuit (43) having its input connected to the output of said second addition means (42) for producing a picture motion detection signal whenever said output of said second addition means exceeds a predetermined threshold magnitude, the output of said threshold value circuit (43) being connected to said control input of said picture blending means.

3. Apparatus according to claim 2 in which said signal delay means has two additonal taps, respectively for a delay of one television frame less two television lines and for a delay of one television frame plus two television lines and in which said picture movement detector circuit comprises also:

a subtraction circuit (44) having its input connected respectively to said two additional taps of said signal delay means, an absolute value circuit (45) having its input connected to the output of said subtraction circuit (44) for producing an output of constant sign and of a magnitude representative of the magnitude, regardless of sign, of the output of said subtraction circuit (44), and a threshold value circuit (46) having its input connected to the output of said absolute value circuit (45), for providing an output when the output of said absolute value circuit exceeds a predetermined threshold value, said picture blending means (15) having a second input which is connected to the output of said threshold circuit (46) having its input connected to the output of said third absolute value circuit for producing a second picture motion detector signal whenever the output of said third absolute value circuit exceeds a predetermined threshold magnitude.

4. Apparatus according to claim 1, in which said first linear matrix has an additional output for a first luminance correction signal ($Y_K$) and said second linear matrix has a separate output for a second luminance correction signal ($Y'_K$), said respective first and second luminance correction signals being provided from said outputs to said picture blending means through low-pass filters (16, 17) for making possible the elimination of comb filter effects at low video frequency from the luminance signals (Y, Y') when respectively added thereto under control of said picture movement detector circuit, said matrices being respectively provided for that purpose with subtraction circuits (31, 32) for subtracting said respective output luminance signals of said matrices from twice the value of the signal at said tap for said signal delayed by one frame.

5. Apparatus according to claim 4, in which said second linear matrix has an additional output for first and second chrominance correction signals respectively for its chrominance signal outputs and band-pass filters for respectively supply said chrominance correction signals to said picture blending means for removal of comb filter effects by addition to said chrominance signal outputs under control of said picture movement detector circuit, said second linear matrix being provided for that purpose with a subtraction circuit for subtracting said television signal with delay of one frame less one line from twice the value of said television signal with delay of one frame to provide a first chrominance correction signal ($C'_{1K}$), a second chrominance correction signal ($C'_{2K}$) being provided directly from said televsion signal at said tap making said television signal available with a delay of one frame plus one line.

6. Apparatus for separation of the luminance and the color information of an NTSC standard color television signal having a quadrature modulated color carrier wave, comprising;

signal delay means (71, 72, 73, 74) for delaying said television signal for two televsion frame periods having input and output connections and having taps for making accessible partially delayed signals, said taps respectively making said television signal available with delays of one frame less one line, one frame, and one frame plus one line;

a first linear matrix circuit, having inputs respectively connected to said input connection, said output connection and said tap for signals delayed one frame of said signal delay means, for combining the signals at its said respective inputs according to the formula $Y = \frac{1}{4}Z^1 + \frac{1}{2}Z^0 + \frac{1}{4}Z^{-1}$ for producing an output luminance signal and according to the formula $C = -\frac{1}{4}Z^1 + \frac{1}{2}Z^0 - \frac{1}{4}Z^{-1}$ for producing a chrominance output signal, in which formulas Y represents the output luminance signal of said first linear matrix circuit, C represents the output chrominance signal thereof, $Z^1$ represents the signal at the input connection of said signal delay means, $Z^0$ represents the signal at said tap for signals delayed one frame of said signal delay means and $Z^{-1}$ represents said signal to said output connection of said signal delays means;

a second linear matrix circuit having inputs connected to said signal delay means respectively at all three of said taps for combining the signals at its said respective inputs according to the formula $Y' = \frac{1}{4}Z^h + \frac{1}{2}Z^0 + \frac{1}{4}Z^{-h}$ for producing a second output luminance signal and according to the formula $C' = -\frac{1}{4}Z^h + \frac{1}{2}Z^0 - \frac{1}{4}Z^{-h}$ for producing a second chrominance output signal in which formulas Y' represents the output luminance signal, C' represents the output chrominance signal, $Z^h$ represents the signal at said tap making said television signal available at a delay of one frame less one line, $Z^0$ represents a signal at said tap for signals delayed one frame and $Z^{-h}$ represents said signal at said tap making available a television signal at a delay of one frame plus one line;

picture blending means connected to said outputs of said linear matrix circuits and also having a control input, and a picture movement detector having inputs respectively connected to said signal delay means at said input connection thereof, said output connection thereof and said tap for signals delayed one frame, having an output connected to said control input of said picture blending means, and containing means for obtaining first difference signals equal to the absolute value of the difference between the signals at said output of said signal delay means and the signals at said input of said signal delay means, first adding means for obtaining sum signals equal to the sum of said signals at said output of said signal delay means and said signals at said input of said signal delay means, means for obtaining second difference signals equal to the absolute value of the difference between said sum signals and twice the magnitude of said signals at said tap for making available signals delayed one frame, second adding means for adding said first difference signals to said second difference signals to produce second sum signals and invertings means for producing a movement detection signal varying in a manner inverse to the variation of said second sum signals.

7. Apparatus according to claim 6, in which said first matrix circuit has an additional output for a first luminance correction signal ($Y_K$) and said second matrix circuit has a separate output for a second luminance correction signal ($Y'_K$), said respective first and second luminance correction signals being provided from said outputs to said picture blending means through low-pass filters (16, 17) for making possible the elimination of comb filter effects at low video frequency from the matrix output luminance signals (Y, Y') when respectively added thereto under control of said picture movement detector circuit, said matrices, for the purpose of producing said chrominance signals (C,C') and said luminance correction signals ($Y_K$, $Y'_K$), being respectively provided with subtraction circuits (131,132) for respectively subtracting the sums of the least and most delayed inputs to the respective matrices in each case from twice the value of the signal at said tap for said signal delayed by one frame.

* * * * *